Jan. 30, 1923.
F. T. LIPPINCOTT.
CONNECTOR.
FILED JAN. 27, 1922.
1,443,579
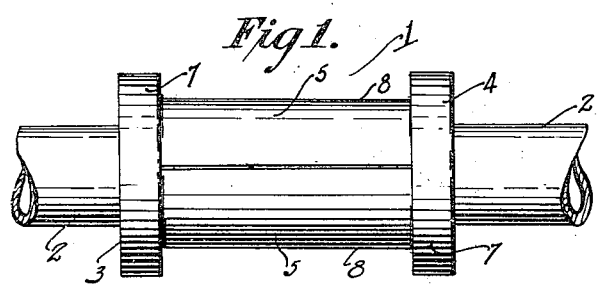
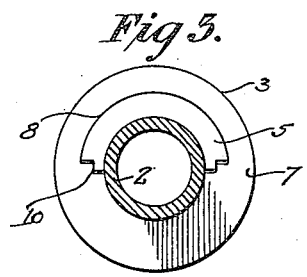
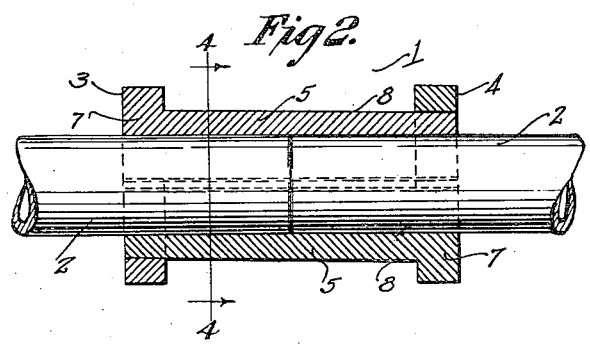
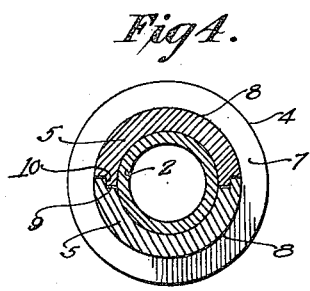
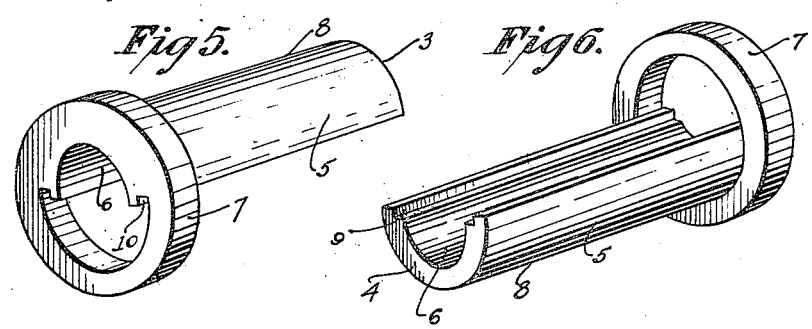
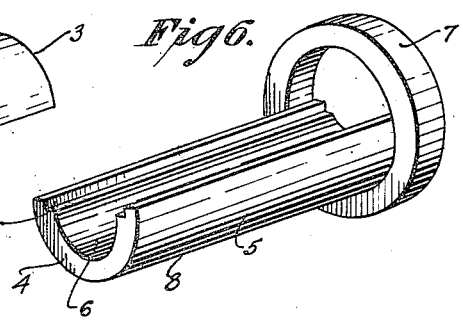
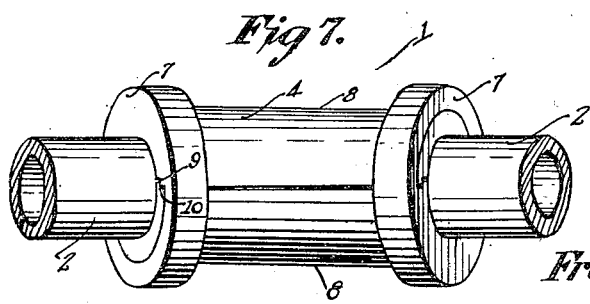
Inventor
Frank T. Lippincott
By C. C. Shepherd,
Attorney Patented Jan. 30, 1923.

1,443,579

UNITED STATES PATENT OFFICE.

FRANK T. LIPPINCOTT, OF NEWARK, OHIO.

CONNECTOR.

Application filed January 27, 1922. Serial No. 532,324.

*To all whom it may concern:*

Be it known that FRANK T. LIPPINCOTT, a citizen of the United States, residing at Newark, in the county of Licking and State of Ohio, has invented certain new and useful Improvements in Connectors, of which the following is a specification.

This invention relates to an improved coupling designed for connecting longitudinally aligned members, and the primary object thereof is to provide a coupling or connector between operable adjusting members which will enable the latter to be quickly and securely united and retained against relative separation without employing the use of screw threads, bolts and other connectors which require considerable manual labor in effecting or breaking the connection.

Another object of the invention rests in the provision of a connector or coupling which consists of a pair of substantially duplicate halves or sections, said sections being retained against radial separation by rings formed at the ends thereof, said sections being provided with longitudinally extending sockets in which the adjoining members to be clamped are positioned. The said socket members are not of uniform thickness throughout their length. The free end of a socket member which is adapted to be received within the ring of the complemental member is thinner than its other end, the outer surface tapering so as to form a wedging surface against the interior of the ring which receives it. It will be seen that by reason of this construction the sockets are caused to clamp the members which are to be connected with increasing pressure as they are forced toward each other so that when the halves of the connector have been driven toward each other as far as possible a very tight fit is secured.

A further object of the invention rests in the provision of a connector or coupling possessing the above structural characteristics and by means of which aligned shaft sections may be quickly united for uniform rotative movement, and in constructing the connector so the same may be utilized in securely uniting adjoining pipe sections or in any other capacity in which adjoining members are desired to be firmly united.

With these and other objects in view, as will appear as the description proceeds, the invention accordingly consists in the novel features of construction, combinations of elements and arrangements of parts, hereinafter fully described and pointed out in the appended claims.

In the accompanying drawings, forming a part of this specification and in which similar characters of reference denote like and corresponding parts throughout the several views thereof:

Figure 1 is a side elevation of the improved connector comprising the present invention, Figure 2 is a vertical longitudinal sectional view taken through the connector, Figure 3 is an end elevation of the connector, Figure 4 is a sectional view taken transversely through the connector on the line 4—4 of Figure 1, Figure 5 is a detail perspective view of one of the connector sections, Figure 6 is a perspective view of the other section, and Figure 7 is a detail view showing a slightly modified form of the invention when used in connecting angularly extending members.

Referring more particularly to the accompanying drawings, the numeral 1 designates my improved connector in its entirety. In the form of the connector illustrated, the same is intended to connect, as shown in Figures 1 and 2, a pair of aligned pipes or shafts 2, and to connect these adjoining members securely and effectually without resorting to the use of the ordinary pipe unions, or shaft couplings. To effect this result, the union consists of a pair of substantially duplicate sections 3 and 4 suitably proportioned in accordance with the service to which they are placed. These sections each consists of a longitudinally extending semicircular body portion 5 including a longitudinally extending groove or socket 6 in which the pipes 2 are positioned, the said sections when in assembled relationship have their grooves so positioned as to constitute in the connector a longitudinally extending circular opening in which the adjoining ends of the pipes 2 are arranged. An end of each section is enlarged to produce a circular flange or ring 7 which is of such form as to receive and surround the relatively reduced end of the other cooperating section, the said ring serving, when the parts are positioned as shown in Figure 2, to prevent radial separating movement of the sections of the connector. An important feature in the present invention resides in inclining the outer surfaces 8 of the sections 3 and 4 so that such surfaces will extend angularly with respect to the longitudinal axis of the connection. By this construction an arrangement is provided by means of which when the sections are forced longitudinally toward each other, the effective diameter of the pipe receiving opening formed longitudinally in the connection will be gradually lessened and, conversely, the diameter of said opening will be gradually increased as the sections are drawn longitudinally apart. This action is the direct result of the provision of the wedge shaped or inclined surfaces 8. The surfaces or edges 8 of the section 4 are provided with inwardly located longitudinally extending guide ribs 9, while the section 3 is formed with cooperating outwardly located guide ribs 10 with which the ribs 9 extend parallel. These ribs are employed to preclude undue lateral shifting movement between the sections when the latter are separated to a distance in which the rings are released from engagement with the opposite ends of the sections. The use of these ribs, however, is not mandatory in carrying out the features of the invention.

In operation, it will be seen, as shown in Figures 1 and 2, that the sections of the coupler or connector will first be positioned upon the opposite ends of a pair of adjoining pipes or shafts, so that the sections will be separated. Then by forcing the sections together in a longitudinal direction, the reduced ends thereof will be positioned within the rings 7, and the sections will be firmly and frictionally forced into clamping relationship with the pipe or shaft ends by the application of pressure of the delivery of blows to the enlarged ring ends thereof. This frictional pressure will be sufficient to unite a pair of pipes firmly together, or to lock adjoining shafts so that the latter will rotate unitarily and with an absence of relative rotary movement. By this construction, a connector is provided essentially simple in its construction which may be readily employed for locking a pair of relatively separable members together and to accomplish this object without threading the pipes or shaft ends or performing other expensive, slow and tedious operations heretofore necessary by use of ordinary connectors. It will be apparent that the invention is not limited in its scope to the connecting of longitudinally aligned members, but as shown in the modified form of the invention, the connector may be shaped to unite angularly disposed pipes, for example, in lieu of the ordinary elbow fittings.

When the connector is to be used for uniting water pipes or other conduits a suitable cement may be inserted within the connector sections to seal the joints.

What is claimed is:

1. A connector comprising a pair of substantially duplicate sections including grooved adjoining faces formed to constitute an opening for the reception of a pair of separable members, loops formed upon an end of each of said sections and arranged to receive the ends of the other sections, and longitudinally inclined surfaces formed upon said sections and operating when said sections are drawn together to increase the effective diameter of said opening and upon separating movement of said sections to decrease the effective diameter of said opening.

2. A connector comprising a pair of separable sections including longitudinally extending grooves forming a longitudinal opening in said connector for the reception of a pair of separable members, each of said sections including a loop arranged to extend over and receive therein the reduced end of the other section, whereby radial separating movement on the part of said sections will be precluded, and longitudinally inclined edges formed upon said sections and situated so that upon longitudinal inward movement of said sections, said opening will have the effective diameter thereof increased and upon outward movement of said sections said opening will have its effective diameter decreased.

3. A connector comprising a pair of separable sections, each having a groove formed therein to provide a longitudinally extending opening in said connector adapted for the reception of a pair of adjoining members to be united by the connector, each of said sections including a loop arranged to receive the reduced end of the other section, the loop of said sections serving to preclude radial separating movement between said sections, longitudinally extending inclined surfaces provided in connection with said sections, said surfaces being disposed so that upon longitudinal inward movement in a longitudinal direction of said sections, said opening will have its effective diameter decreased, and longitudinally extending guide ribs formed in connection with the inclined surfaces.

In testimony whereof I affix my signature.

FRANK T. LIPPINCOTT.